United States Patent
Nakajima et al.

(10) Patent No.: US 10,461,677 B2
(45) Date of Patent: Oct. 29, 2019

(54) VEHICLE-POWER-GENERATOR CONTROL APPARATUS AND CONTROL METHOD THEREOF

(71) Applicant: Mitsubishi Electric Corporation, Tokyo (JP)

(72) Inventors: Masahiro Nakajima, Tokyo (JP); Junya Sasaki, Tokyo (JP); Katsuyuki Sumimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 162 days.

(21) Appl. No.: 15/702,884

(22) Filed: Sep. 13, 2017

(65) Prior Publication Data

US 2019/0006972 A1 Jan. 3, 2019

(30) Foreign Application Priority Data

Jun. 28, 2017 (JP) ................. 2017-125833

(51) Int. Cl.
*H02P 9/08* (2006.01)
*H02P 9/02* (2006.01)
(Continued)

(52) U.S. Cl.
CPC .............. *H02P 9/08* (2013.01); *H02P 9/02* (2013.01); *H02P 9/14* (2013.01); *B60R 16/03* (2013.01)

(58) Field of Classification Search
CPC ..... H02P 9/08; H02P 9/14; H02P 9/02; B60R 16/03
See application file for complete search history.

(56) References Cited

U.S. PATENT DOCUMENTS

| 7,365,520 B2 * | 4/2008 | Tsuzuki | H02P 9/48 322/24 |
| 8,701,803 B2 * | 4/2014 | Ozaki | B60L 3/0061 180/65.275 |

(Continued)

FOREIGN PATENT DOCUMENTS

| DE | 102008051078 A1 * | 4/2009 |
| JP | 4-312326 A | 11/1992 |

(Continued)

*Primary Examiner* — Michael J Zanelli
(74) *Attorney, Agent, or Firm* — Sughrue Mion, PLLC; Richard C. Turner (57) ABSTRACT

There is provided a vehicle-power-generator control apparatus and the control method thereof that does not notify a passenger of any erroneous alarm indicating an abnormality in an electric power generator, even when a power-generation stop command is received. it is determined that a vehicle power generator is not rotating, when the rotation speed, of the vehicle power generator, that is detected based on a power-generation voltage generated across an armature winding of the vehicle power generator is the same as or lower than a predetermined value; there is generated a power-generation stop holding signal obtained by delaying by a predetermined time a time point at which a power-generation stop signal, generated when the decoded command signal is a power-generation stop command signal for stopping electric-power generation, stops; then, the non-rotation determination signal is masked and invalidated, based on the power-generation stop holding signal.

8 Claims, 6 Drawing Sheets

(51) Int. Cl.
*H02P 9/14* (2006.01)
*B60R 16/03* (2006.01)

(56) References Cited

U.S. PATENT DOCUMENTS

2007/0188151 A1  8/2007  Yamaguchi
2012/0146593 A1  6/2012  Akita et al.

FOREIGN PATENT DOCUMENTS

| JP | 7-274597 A | 10/1995 |
| JP | 2001-173481 A | 6/2001 |
| JP | 2007-215370 A | 8/2007 |
| JP | 2007-230513 A | 9/2007 |
| JP | 2009-100488 A | 5/2009 |
| JP | 2009-240069 | * 10/2009 |
| JP | 2012-125105 A | 6/2012 |

* cited by examiner

VEHICLE-POWER-GENERATOR CONTROL APPARATUS AND CONTROL METHOD THEREOF

BACKGROUND OF THE INVENTION

Field of the Invention

The present invention relates to a vehicle-power-generator control apparatus and the control method thereof; more particularly, it relates to a vehicle-power-generator control apparatus provided with a function of preventing erroneous detection of an abnormality in a vehicle power generator and the control method thereof.

Description of the Related Art

To date, there has existed a vehicle-power-generator control apparatus that controls the output of a vehicle power generator whose driving source is an engine mounted in a vehicle, in accordance with the traveling state of the vehicle. In such a conventional vehicle-power-generator control apparatus, in order to raise the gasoline mileage of a vehicle or to raise the acceleration performance of the vehicle, the power generation by an electric power generator is suppressed by use of a charge control technology so that the load on the engine is reduced.

For example, in the conventional vehicle-power-generator output control apparatus disclosed in Patent Document 1, when the traveling state of a vehicle is the acceleration state, the energization amount for the magnetic-field winding is controlled to be a value smaller than the reference amount so that the load to be imposed on the vehicle engine by the electric power generator is reduced.

Moreover, in the conventional vehicle-power-generator control apparatus disclosed in Patent Document 2, when an acceleration detection means detects the acceleration state of the engine, a control means stops the electric power generator from generating power under the condition that the integration value of the battery consumption current, which is integrated by an integration means, is the same as or smaller than a predetermined value so that in the acceleration mode, the operation of the electric power generation is suppressed to a critical mass and hence the acceleration performance is secured.

Still moreover, the conventional power source control apparatus disclosed in Patent Document 3 includes a charging rate detection means that calculates the charging rate, based on the charging current to the battery, and a power-generation amount control means that controls the power-generation amount, based on the state of a traveling body and the output of the charging rate detection means; the power source control apparatus suppresses the power-generation amount when the charging rate is the same or larger than a predetermined value.

In general, in the case where in a vehicle-power-generator control apparatus, such a charge control technology as described above is utilized, a control unit (referred to as an ECU, hereinafter) transmits a power-generation stop command to the vehicle power generator. Because the current flowing to the magnetic-field winding is cut off, the vehicle power generator that has received the power-generation stop command stops the power-generation output; however, because the signal to be inputted to a rotation speed detection unit for detecting the rotation speed of the electric power generator is also cut off, the rotation speed detection unit erroneously determines that the electric power generator does not rotate and notifies the ECU of the result of the erroneous determination, and hence the ECU erroneously determines that the electric power generator has abnormally stopped; thus, a malfunction may be caused in the control. In this case, when a lamp for notifying that the electric power generator has abnormally stopped is provided, the lamp is lit; however, the lightning of the lamp is caused not because the electric power generator has abnormally stopped but because it is erroneously determined that the electric power generator does not rotate.

In contrast, in the conventional electric-power-generator control apparatus disclosed in Patent Document 4, even when a power-generation stop command is received, an initial magnetizing current is intentionally made to flow so that the armature winding outputs a rotation speed detection pulse and hence the rotation speed detection unit is prevented from erroneously determining that the electric power generator does not rotate.

In the conventional power-generation control apparatus disclosed in Patent Document 5, an abnormal determination received from a vehicle power generator is masked with software in the time period from a time when an ECU transmits a power-generation stop command to the vehicle power generator to a time when the power-generation stop command is cancelled.

PRIOR ART REFERENCE

Patent Document

[Patent Document 1] Japanese Patent Application Laid-Open No. H4-312326
[Patent Document 2] Japanese Patent Application Laid-Open No. 2001-173481
[Patent Document 3] Japanese Patent Application Laid-Open No. H7-274597
[Patent Document 4] Japanese Patent Application Laid-Open No. 2009-100488
[Patent Document 5] Japanese Patent Application Laid-Open No. 2007-215370

In the conventional electric-power-generator control apparatus disclosed in Patent Document 4, even when a power-generation stop command is received and the power-generation output from the electric power generator is stopped, an initial magnetizing current is intentionally made to flow so that it is made possible that the armature winding outputs a rotation speed detection pulse and hence it is made possible to prevent an erroneous determination that the electric power generator has abnormally stopped; however, because the initial magnetizing current is intentionally made to flow in the magnetic-field winding, a load is imposed on the engine and hence engine torque is consumed; thus, there has been a problem that the gasoline mileage and the acceleration performance are deteriorated.

In contrast, in the conventional power-generation control apparatus disclosed in Patent Document 5, an abnormal determination based on a signal received from a vehicle power generator is masked with software in the time period from a time when an ECU transmits a power-generation stop command to the vehicle power generator to a time when the power-generation stop command is cancelled. When the ECU cancels the power-generation stop command, the vehicle-power-generator control apparatus tries to immediately resume the power generation; however, due to the time constants of the magnetic-field winding and the armature winding to be utilized in the power generation, the magnetic-field current starts to flow after a voltage is applied to the magnetic-field winding and a certain amount of time elapses; then, after the rotation speed detection pulse is generated across the armature winding, the rotation speed can finally be detected. Accordingly, because the method, according to Patent Document 5, of mask-processing a non-rotation alarm does not make it possible to mask the non-rotation alarm that is generated after the power-generation stop command is cancelled, there has been a problem that the ECU is notified of the non-rotation alarm.

The present invention has been implemented in order to solve the foregoing problems in conventional vehicle-power-generator control apparatuses; the objective thereof is to provide a vehicle-power-generator control apparatus and the control method thereof that do not excessively deteriorate the gasoline mileage and the acceleration performance and that do not notify a passenger of an erroneous alarm for the abnormality in the electric power generator, even when the ECU transmits a power-generation stop command to the vehicle-power-generator control apparatus.

SUMMARY OF THE INVENTION

A vehicle-power-generator control apparatus according to the present invention controls a vehicle power generator mounted in a vehicle, based on a command from a control unit provided in the vehicle; the vehicle-power-generator control apparatus is characterized by including a reception unit that receives a command signal obtained by encoding a command from the control unit, a decoding unit that decodes the command signal received by the reception unit and then outputs a control voltage based on the command from the control unit, a first comparator that compares the control voltage with an output voltage based on a power-generation voltage that is generated across an armature winding by the vehicle power generator, a magnetic-field driver that controls the power-generation voltage by controlling a magnetic-field current flowing in a magnetic-field winding of the vehicle power generator, based on an output signal of the first comparator, a rotation speed detection unit that detects a rotation speed of the vehicle power generator, based on a power-generation voltage generated across the armature winding of the vehicle power generator, a non-rotation determination unit that determines that the vehicle power generator is not rotating and generates a non-rotation determination signal, when the rotation speed detected by the rotation speed detection unit is the same as or lower than a predetermined value, a power-generation stop command determination unit whose output signal changes the level thereof depending on whether or not the command signal decoded by the decoding unit is a power-generation stop command for stopping electric-power generation, a second comparator that generates an output signal, based on comparison between the control voltage and an output voltage based on a power-generation voltage generated by the vehicle power generator, a logic unit that generates a power-generation stop signal indicating that the electric-power generation has stopped, based on the output signal of the power-generation stop command determination unit and the output signal of the second comparator, a delay unit to which the power-generation stop signal generated by the logic unit is inputted and that generates a power-generation stop holding signal obtained by delaying by a predetermined time the terminating time point of the inputted power-generation stop signal, and a mask processing unit that invalidates the non-rotation determination signal generated by the non-rotation determination unit, based on the power-generation stop holding signal generated by the delay unit.

A vehicle-power-generator control method according to the present invention controls a vehicle power generator mounted in a vehicle, based on a command from a control unit provided in the vehicle; the vehicle-power-generator control method is characterized by including the steps of (1) receiving a command signal obtained by encoding a command from the control unit, (2) decoding the received command signal into a control voltage based on the command from the control unit, (3) controlling a magnetic-field current of the vehicle power generator, based on comparison between the control voltage and an output voltage based on a power-generation voltage generated by the vehicle power generator, so as to control the power-generation voltage, (4) determining that the vehicle power generator is not rotating, and generating a non-rotation determination signal, when the rotation speed, of the vehicle power generator, that is detected based on a power-generation voltage generated across an armature winding of the vehicle power generator is the same as or lower than a predetermined value, (5) generating a power-generation stop holding signal obtained by delaying by a predetermined time a time point at which a power-generation stop signal, generated when the decoded command signal is a power-generation stop command signal for stopping electric-power generation, stops, and (6) masking and invalidating the non-rotation determination signal, based on the power-generation stop holding signal.

A vehicle-power-generator control apparatus according to the present invention controls a vehicle power generator mounted in a vehicle, based on a command from a control unit provided in the vehicle; the vehicle-power-generator control apparatus includes a reception unit that receives a command signal obtained by encoding a command from the control unit, a decoding unit that decodes the command signal received by the reception unit and then outputs a control voltage based on the command from the control unit, a first comparator that compares the control voltage with an output voltage based on a power-generation voltage that is generated across an armature winding by the vehicle power generator, a magnetic-field driver that controls the power-generation voltage by controlling a magnetic-field current flowing in a magnetic-field winding of the vehicle power generator, based on an output signal of the first comparator, a rotation speed detection unit that detects a rotation speed of the vehicle power generator, based on a power-generation voltage generated across the armature winding of the vehicle power generator, a non-rotation determination unit that determines that the vehicle power generator is not rotating and generates a non-rotation determination signal, when the rotation speed detected by the rotation speed detection unit is the same as or lower than a predetermined value, a power-generation stop command determination unit whose output signal changes the level thereof depending on whether or not the command signal decoded by the decoding unit is a power-generation stop command signal for stopping electric-power generation, a second comparator that generates an output signal, based on comparison between the control voltage and an output voltage based on a power-generation voltage generated by the vehicle power generator, a logic unit that generates a power-generation stop signal indicating that the electric-power generation has stopped, based on the output signal of the power-generation stop command determination unit and the output signal of the second comparator, a delay unit to which the power-generation stop signal generated by the logic unit is inputted and that generates a power-generation stop holding signal obtained by delaying by a predetermined time the terminating time point of the inputted power-generation stop signal, and a mask processing unit that invalidates the non-rotation determination signal generated by the non-rotation determination unit, based on the power-generation stop holding signal generated by the delay unit.

As a result, there is demonstrated an effect that the vehicle-power-generator control apparatus does not excessively deteriorate the gasoline mileage and the acceleration performance and does not notify a passenger of any erroneous alarm for an abnormality in the electric power generator, even when the ECU transmits a power-generation stop command to the vehicle-power-generator control apparatus.

A vehicle-power-generator control method according to the present invention controls a vehicle power generator mounted in a vehicle, based on a command from a control unit provided in the vehicle; the vehicle-power-generator control method includes the steps of (1) receiving a command signal obtained by encoding a command from the control unit, (2) decoding the received command signal into a control voltage based on the command from the control unit, (3) controlling a magnetic-field current of the vehicle power generator, based on comparison between the control voltage and an output voltage based on a power-generation voltage generated by the vehicle power generator, so as to control the power-generation voltage, (4) determining that the vehicle power generator is not rotating, and generating a non-rotation determination signal, when the rotation speed, of the vehicle power generator, that is detected based on a power-generation voltage generated across an armature winding of the vehicle power generator is the same as or lower than a predetermined value, (5) generating a power-generation stop holding signal obtained by delaying by a predetermined time a time point at which a power-generation stop signal, generated when the decoded command signal is a power-generation stop command signal for stopping electric-power generation, stops, and (6) masking and invalidating the non-rotation determination signal, based on the power-generation stop holding signal.

As a result, there is demonstrated an effect that the vehicle-power-generator control apparatus does not excessively deteriorate the gasoline mileage and the acceleration performance and does not notify a passenger of any erroneous alarm for an abnormality in the electric power generator, even when the ECU transmits a power-generation stop command to the vehicle-power-generator control apparatus.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
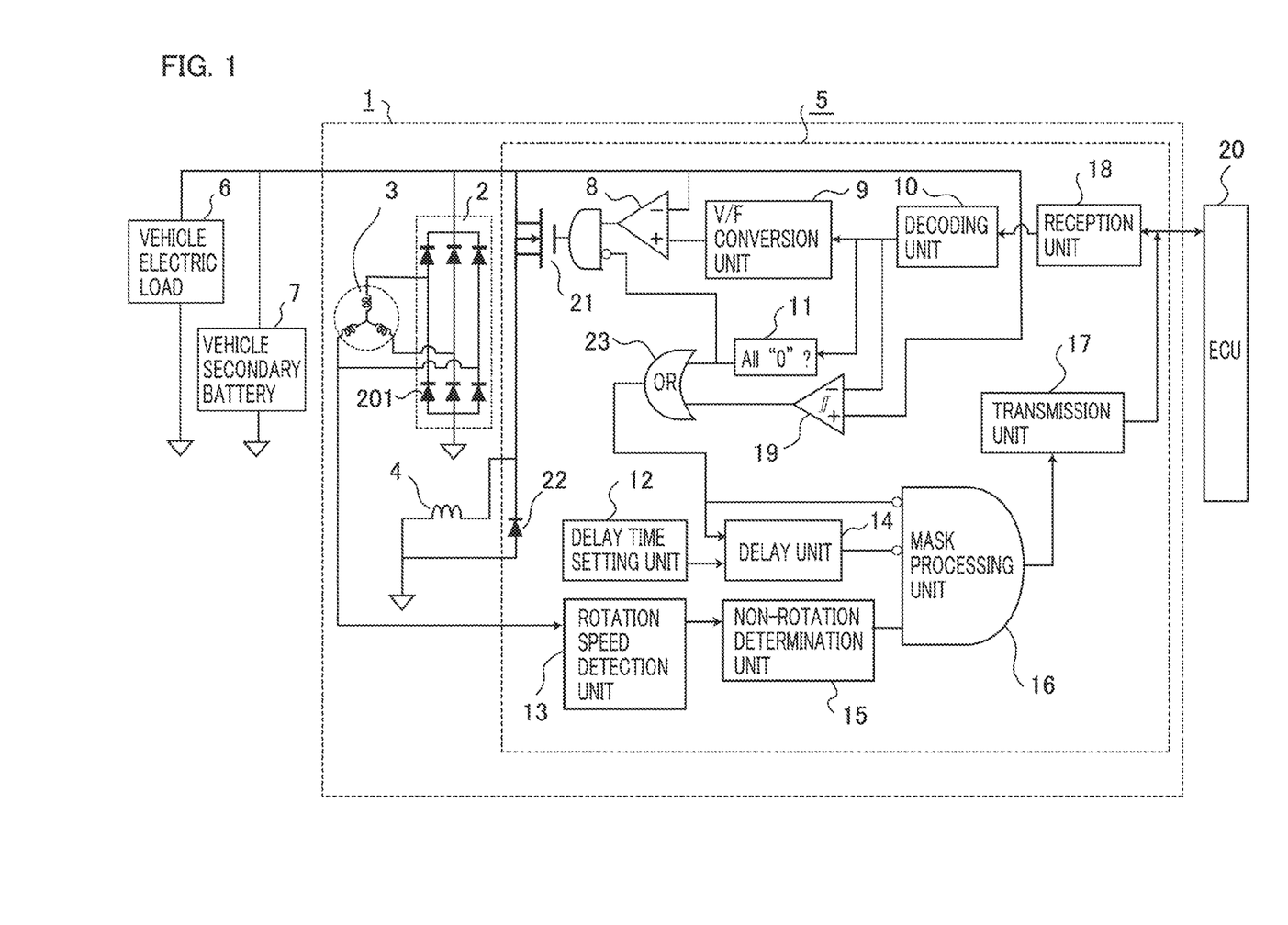
FIG. 1 is a block diagram illustrating a vehicle-power-generator control apparatus according to Embodiment 1 of the present invention.

Hereinafter, a vehicle-power-generator control apparatus and the control method thereof according to Embodiment 1 of the present invention will be explained in detail with reference to the drawings. FIG. 1 is a block diagram illustrating a vehicle-power-generator control apparatus according to Embodiment 1 of the present invention. In FIG. 1, a vehicle power generator 1 mounted in a vehicle such as an automobile is configured as a three-phase AC power generator; the stator thereof is provided with a three-phase Y-connection armature winding 3; the rotor thereof is provided with a magnetic-field winding 4. The rotor provided with the magnetic-field winding 4 is coupled with the output axle of an engine mounted in the vehicle, through a belt (unillustrated), driven to rotate by driving force of the engine, and causes a three-phase AC voltage to be induced across the armature winding 3 provided in the stator.

The three-phase voltage induced across the armature winding 3 is full-wave rectified by a rectification circuit 2 configured with six semiconductor rectifying devices 201 so as to be converted into a DC voltage and is supplied to a controller 5, a vehicle electric load 6, and a vehicle secondary battery 7. The controller 5, which is fixed to the housing (unillustrated) of the vehicle power generator 1, controls a magnetic-field current flowing in the magnetic-field winding 4 of the vehicle power generator 1, based on an instruction from an ECU 20, so as to control the output voltage of the vehicle power generator 1; the controller 5 has a function of mainly performing control in such a way that the output voltage and the output current of the vehicle power generator 1 become substantially constant.

The controller 5 has a magnetic-field driver 21 that controls a magnetic-field current to the magnetic-field winding 4 and a circulation diode 22 that makes the magnetic-field current flowing in the magnetic-field winding 4 circulate at a time when the magnetic-field driver 21 is turned off. The controller 5 and the ECU 20 perform interactively communication by use of an interactive communication apparatus based on, for example, a LIN (Local Interconnect Network).

The controller 5 further includes a first comparator 8, a voltage/frequency conversion unit (referred to as a V/F conversion unit, hereinafter) 9, a decoding unit 10, a power-generation stop command determination unit 11, a delay time setting unit 12, a rotation speed detection unit 13, a delay unit 14, a non-rotation determination unit 15, a mask processing unit 16, a transmission unit 17, a reception unit 18, a second comparator 19, the magnetic-field driver 21, the circulation diode 22, and an OR unit 23.

Each of the first comparator 8, the V/F conversion unit 9, the decoding unit 10, the power-generation stop command determination unit 11, the delay time setting unit 12, the rotation speed detection unit 13, the delay unit 14, the non-rotation determination unit 15, the mask processing unit 16, the second comparator 19, and the OR unit 23 may be configured with either components as hardware elements or predetermined software stored in a microprocessor.

The reception unit 18 receives a command signal formed of encoded data transmitted from the ECU 20 through the foregoing interactive communication apparatus. The decoding unit 10 decodes the command signal from the reception unit 18. The V/F conversion unit 9 converts a control voltage based on the command signal from the decoding unit 10 into a sawtooth-wave voltage. The first comparator 8 compares the output voltage of the vehicle power generator 1, which is inputted to one of the input terminals thereof, with the sawtooth-wave voltage from the V/F conversion unit 9, which is inputted to the other one of the input terminals thereof; then, based on the comparison result, the first comparator 8 generates an output signal, described later.

The power-generation stop command determination unit 11 determines whether or not the command signal from the decoding unit 10 is the power-generation stop command. The second comparator 19 compares the output voltage of the vehicle power generator 1 with the control voltage based on the command signal from the decoding unit 10; when the control voltage is higher than the output voltage of the vehicle power generator 1, the second comparator 19 outputs an output signal, which is significant. The OR unit 23 generates an output signal when any one of the respective outputs of the power-generation stop command determination unit 11 and the second comparator 19 is inputted thereto.

The delay unit 14 delays a signal inputted from the OR unit 23 by a delay time set by the delay time setting unit 12 and then outputs the delayed signal. By measuring the edge interval of a power-generation phase voltage that is generated and outputted by the armature winding 3, the rotation speed detection unit 13 detects and outputs the rotation speed of the rotor provided with the magnetic-field winding 4. Based on the output of the rotation speed detection unit 13, the non-rotation determination unit 15 determines whether or not the vehicle power generator 1 is rotating; in the case where the non-rotation determination unit 15 determines that the vehicle power generator 1 is not rotating, the transmission unit 17 notifies the ECU 20 of a non-rotation alarm by way of the mask processing unit 16.

Figure 2:
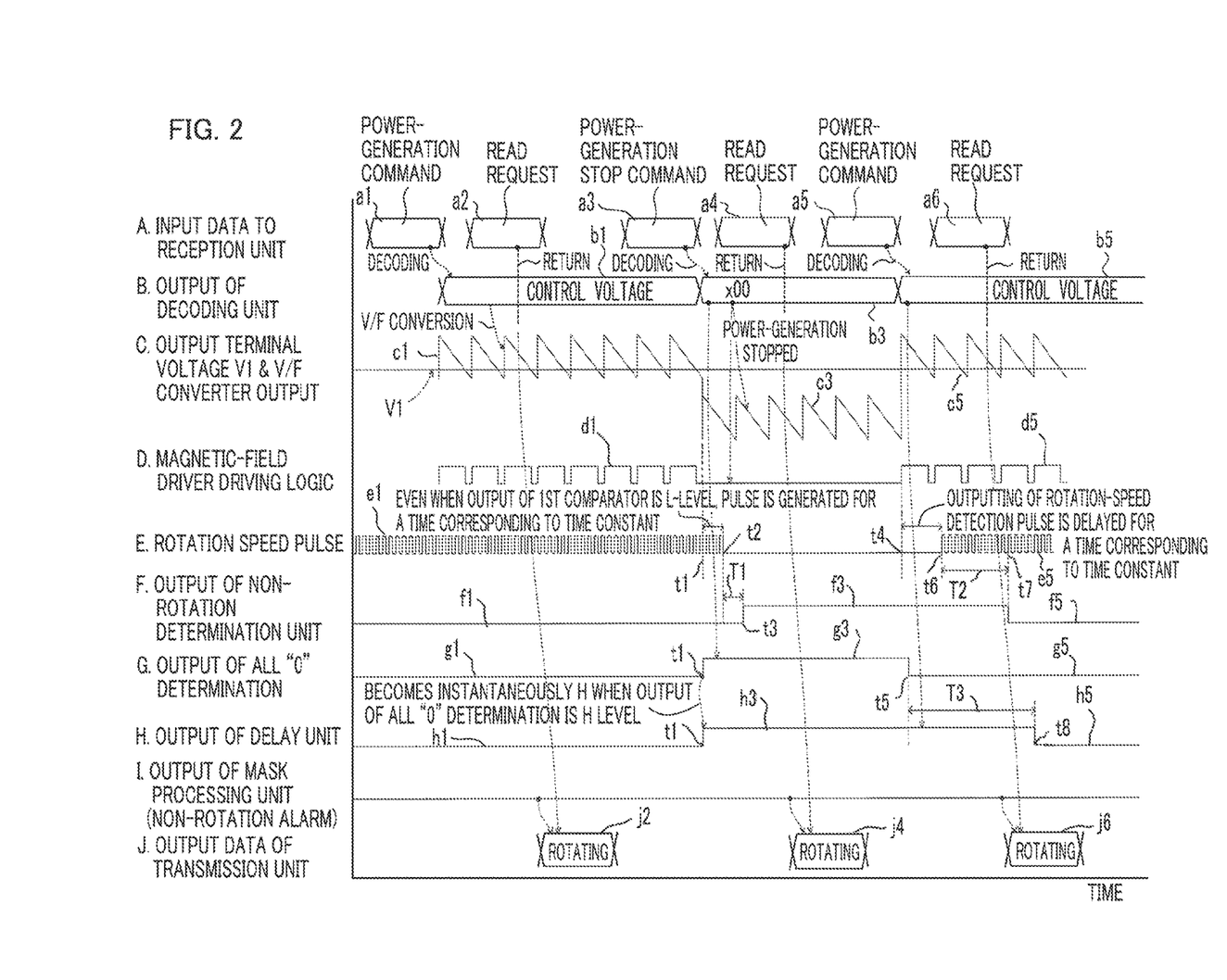
FIG. 2 is a timing chart for explaining the operation of the vehicle-power-generator control apparatus according to Embodiment 1 of the present invention.

FIG. 2 is a timing chart for explaining the operation of the vehicle-power-generator control apparatus according to Embodiment 1 of the present invention; in the ordinate, [A], [B], [C], [D], [E], [F], [G], [H], [I], and [J] denote input data that is inputted from the ECU 20 to the reception unit 18, output data of the decoding unit 10, an output waveform of the V/F conversion unit 9, a driving logic waveform of the magnetic-field driver 21, a rotation speed pulse waveform that is inputted to the rotation speed detection unit 13, an output waveform of the non-rotation determination unit 15, a determination output waveform of the power-generation stop command determination unit 11, an output waveform of the delay unit 14, an output waveform of the mask processing unit 16, and output data of the transmission unit 17, respectively. The abscissa in FIG. 2 denotes the time.

In FIGS. 1 and 2, as represented by [A] in FIG. 2, the encoded command signals that are inputted from the ECU 20 to the reception unit 18 include, at respective different timings, power-generation commands a1 and a5, read requests a2, a4, and a6, a power-generation stop command a3, and the like. The decoding unit 10 decodes the [power-generation commands] a1 and a5 among the commands signals from the reception unit 18 and outputs, as represented by [B] in FIG. 2, the [control voltages] b1 and b5, which are control voltage command signals indicating control voltage values for the vehicle power generator 1. Moreover, the decoding unit 10 decodes the [power-generation stop command] a3 among the commands signals from the reception unit 18 and outputs, as represented by [B] in FIG. 2, a power-generation stop command signal [x00] b3 for the vehicle power generator 1.

When receiving a control voltage command signal from the decoding unit 10, the V/F conversion unit 9 outputs a sawtooth-wave voltage represented by [C] in FIG. 2. That is to say, for example, when receiving a control voltage command signal [control voltage] b1 from the decoding unit 10, the V/F conversion unit 9 outputs a sawtooth-wave voltage signal c1 having a frequency corresponding to the control voltage instructed by the [control voltage] b1; when receiving a control voltage command signal [control voltage] b5, the V/F conversion unit 9 outputs a sawtooth-wave voltage signal c5 having a frequency corresponding to the control voltage instructed by the [control voltage] b5.

Furthermore, when receiving the power-generation stop command signal [x00] b3 from the decoding unit 10, the V/F conversion unit 9 outputs a sawtooth-wave voltage signal c3, as represented by [C] in FIG. 2, that is lower than an output terminal voltage V1 of the vehicle power generator 1.

Here, based on FIGS. 1 and 2, the operation of controlling the power-generation output of the vehicle power generator 1, performed by the controller 5, will be explained in detail. The first comparator 8 compares the sawtooth-wave voltage signal represented by [C] in FIG. 2, obtained through conversion by the V/F conversion unit 9, with the output terminal voltage V1 of the vehicle power generator 1, represented by [C] in FIG. 2. When each of the sawtooth-wave voltage signals c1, c3, and c5 is higher than the output terminal voltage V1 of the vehicle power generator 1, the first comparator 8 outputs a high-level-potential signal (referred to as a H-level signal, hereinafter) and inputs a H-level signal to the magnetic-field driver 21.

A command signal from the decoding unit 10 is inputted to power-generation stop command determination unit 11; when the command signal is not the power-generation stop command signal [x00] b3, the power-generation stop command determination unit 11 always outputs a low-level-potential signal (referred to as a L-level signal, hereinafter); when the command signal inputted thereto is the power-generation stop command signal [x00] b3, the power-generation stop command determination unit 11 outputs a H-level signal.

The output signal of the first comparator 8 is inputted to one of the input terminals of the magnetic-field driver 21; the output signal of the power-generation stop command determination unit 11 is inverted and then inputted to the other one of the input terminals of the magnetic-field driver 21. Accordingly, because when the foregoing command signal is not the power-generation stop command signal [x00] b3, the H-level signal obtained by inverting the L-level signal from the power-generation stop command determination unit 11 is inputted to the other input terminal of the magnetic-field driver 21, the magnetic-field driver 21 turns on when the signal inputted thereto from the first comparator 8 is a H-level signal, and turns off when the signal inputted thereto from the first comparator 8 is a L-level signal.

Thus, in the case where the foregoing command signal is not the power-generation stop command signal [x00] b3, the magnetic-field driver 21 is controlled based on the magnetic-field-driver driving logic driving signals d1 and d5, represented by [D] in FIG. 2, that are obtained from the control voltage command signals [control voltages] b1 and b5 from the ECU 20, so that the magnetic-field current flowing in the magnetic-field winding 4 is PWM (Pulse Width Modulation)-controlled and hence the output voltage of the vehicle power generator 1 is controlled in such a way as to become an instructed predetermined power-generation voltage.

Next, the case where the foregoing command signal is the power-generation stop command signal [x00] b3 will be explained. As described above, when receiving the power-generation stop command signal [x00] b3, the V/F conversion unit 9 generates the sawtooth-wave voltage signal c3, as represented by [C] in FIG. 2, that is the same as or lower than the output terminal voltage V1 of the vehicle power generator 1; thus, the output signal of the first comparator 8 becomes the L-level signal. Accordingly, the magnetic-field driver 21 turns off; the magnetic-field current is cut off; then, the vehicle power generator 1 stops its electric-power generation.

In addition, when receiving the power-generation stop command signal [x00] b3, the power-generation stop command determination unit 11 outputs the H-level signal, and the L-level signal obtained by inverting the H-level signal is inputted to the magnetic-field driver 21; thus, the magnetic-field driver 21 is turned off, regardless of the level of the output signal of the first comparator 8.

Next, there will be explained the operation, of detecting the non-rotation alarm for the vehicle power generator, that is performed in the vehicle-power-generator control apparatus, according to Embodiment 1 of the present invention, that is configured as described above. In FIGS. 1 and 2, by measuring the respective edge intervals of the phase voltages, for the three phases, that are generated and outputted by the armature winding 3, the rotation speed detection unit 13 detects the rotation speed of the vehicle power generator 1, i.e., the rotation speed of the rotor of the vehicle power generator 1. [E] in FIG. 2 represents a rotation speed pulse detected by the rotation speed detection unit 13.

Based on the output from the rotation speed detection unit 13, the non-rotation determination unit 15 determines whether or not the vehicle power generator 1 is rotating; in the case where it is determined that the vehicle power generator 1 is not rotating, the non-rotation determination unit 15 inputs a H-level signal to the mask processing unit 16. In addition to the foregoing output signal of the non-rotation determination unit 15, a signal obtained by inverting the output signal of the OR unit 23 and a signal obtained by making the delay unit 14 delay the output signal of the OR unit 23 by a predetermined delay time and then inverting the delayed signal are inputted to the mask processing unit 16.

As described above, the second comparator 19 compares the output voltage of the vehicle power generator 1 with the control voltage based on the command signal from the decoding unit 10; when the control voltage is higher than the output voltage of the vehicle power generator 1, the second comparator 19 generates an output signal, which is significant. The OR unit 23 generates a H-level signal when any one of the respective outputs of the power-generation stop command determination unit 11 and the second comparator 19 is inputted thereto.

In the case where at a time point t1, the command signal is changed from the control voltage command signal [control voltage] b1 to the power-generation stop command signal [x00] b3, the power-generation stop command determination unit 11 immediately changes its output signal from a L-Level signal g1 to a H-Level signal g3 at the time point t1, and then inputs the H-Level signal g3 to the OR unit 23.

When the power-generation stop command determination unit 11 inputs the H-level signal g2 to the OR unit 23 at the time point t1, the OR unit 23 immediately outputs a H-level signal, and a L-level signal, which is the inverted signal of the H-level signal, is inputted to the mask processing unit 16. Because the OR unit 23 concurrently inputs the H-level signal to the delay unit 14 at the time point t1, the output voltage of the delay unit 14 changes from a L-level signal h1 to a H-level signal h2 at the time point t1, as represented by [H] in FIG. 2, and a L-level signal, which is the inverted signal of the H-level signal h2, is inputted to the mask processing unit 16.

Even when the H-level signal from the OR unit 23 is changed to a L-level signal, i.e., even when the power-generation stop command signal [x00] b3 is changed to the control voltage command signal [control voltage] b5 at a time point t4, the delay unit 14 maintains outputting of the H-level signal h3 for an after-mentioned predetermined delay time set by the delay time setting unit 12; then, at a time point t8, the H-level signal h3 is finally changed to a L-level signal h5.

Even when at the time point t1, the control voltage command signal [control voltage] b1 is changed to the power-generation stop command signal [x00] b3 and hence the output of the first comparator 8 becomes the L-level signal, the rotation speed pulse e1, represented by [E] in FIG. 2, that is detected by the rotation speed detection unit 13 disappears at a time point t2, being delayed for a time corresponding to a time constant because there exists the time constant in the armature winding 3. As represented by [F] in FIG. 2, after a detection time T1 elapses from the time point t2 when the rotation speed pulse e1 has disappeared, the non-rotation determination unit 15 determines that the vehicle power generator 1 is not rotating and outputs a H-level signal f3, as a non-rotation signal, at a time point t3.

Furthermore, even when at the time point t4, the power-generation stop command signal [x00] b3 is changed to the control voltage command signal [control voltage] b5 and hence the magnetic-field-driver driving logic driving signal d5 represented by [D] in FIG. 2 starts at the time point t4, a rotation speed pulse e5 is generated, as represented by [E] in FIG. 2, at a time point t6, delayed from the time point t4, due to the effect of the time constant of the armature winding 3 of the vehicle power generator 1. In contrast, as represented by [F] in FIG. 2, the output signal of the power-generation stop command determination unit 11 changes from the H-Level signal g3 to a L-level signal g5 at a time point t5 that is a time point slightly delayed from the time point t4 when the power-generation stop command signal [x00] b3 is changed to the control voltage command signal [control voltage] b5.

As represented by [H] in FIG. 2, the output signal of the delay unit 14 changes from the H-level signal h3 to the L-level signal h5 at the time point t8 that is a predetermined delay time behind the time point t5 when the output signal of the power-generation stop command determination unit 11 changes from the H-Level signal g3 to the L-level signal g5.

Accordingly, the delay unit 14 generates the H-level signal h3 in the time interval from the time point t1 to the time point t8, and then the L-level signal obtained by inverting the H-level signal h3 is inputted to the mask processing unit 16 in the time interval from the time point t1 to the time point t8. As a result, although because the power-generation stop command signal [x00] is generated in the time interval from the time point t1 to the time point t4, the rotation speed pulse disappears in the time interval from the time point t2 to the time point t6 and hence the non-rotation determination unit 15 outputs the H-level signal f3 until the time point t7, the mask processing unit 16 does not transmit the non-rotation determination result, obtained from the non-rotation determination unit 15, to the transmission unit 17.

As represented by [A] in FIG. 2, as the encoded command signals to be inputted to from the ECU 20 to the reception unit 18, the power-generation command a1, the read request a2, the power-generation stop command a3, the read request a4, the power-generation command a5, and the read request a6 are sequentially inputted in that order. The read requests a2, a4, and a6 are to ascertain the rotation condition of the vehicle power generator 1. At the timing when the read request a2 is inputted, the vehicle power generator 1 is generating electric power, based on the control generation command signal [control generation] b1, and hence there exists the rotation speed pulse e1; thus, the output of the non-rotation determination unit 15 is the L-level signal g1. Accordingly, the mask processing unit 16 outputs to the transmission unit 17 a signal indicating that the vehicle power generator 1 is rotating; as represented by [J] in FIG. 2, the transmission unit 17 outputs data [rotating] j2 to the ECU 20.

At the timing when the read request a4 is inputted, the vehicle power generator 1 is not generating electric power, based on the control stop command signal [x00] b3, and hence the rotation speed pulse e1 disappears; thus, the output of the non-rotation determination unit 15 is the H-level signal f3; however, because the delay unit 14 outputs the H-level signal h3, the mask processing unit 16 outputs to the transmission unit 17 a signal indicating that the vehicle power generator 1 is rotating; as represented by [J] in FIG. 2, the transmission unit 17 outputs data [rotating] j4 to the ECU 20.

At the timing when the read request a6 is inputted, the vehicle power generator 1 is generating electric power, based on the control generation command signal [control generation] b5; however, as described above, the non-rotation determination unit 15 maintains outputting of the H-level signal f3 until the time point t7. However, because the H-level signal h3 from the delay unit 14 continues until the time point t8, the mask processing unit 16 outputs to the transmission unit 17 a signal indicating that the vehicle power generator 1 is rotating; as represented by [J] in FIG. 2, the transmission unit 17 outputs data [rotating] j6 to the ECU 20.

As described above, the power-generation stop command received by the reception unit 18 is decoded by the decoding unit 10, determined as the power-generation stop command signal by the power-generation stop command determination unit 11, and then is inputted to the mask processing unit 16 and the delay unit 14 by way of the OR unit 23. The mask processing unit 16 has a function of masking the output of the non-rotation determination unit 15 when the output of either the OR unit 23 or the delay unit 14 is the H-level signal, which is significant; a signal mask-processed by the mask processing unit 16 is notified to the ECU 20 by way of the transmission unit 17.

Next, the delay time setting unit 12 and the delay unit 14 will be explained further in detail. When the output of the OR unit 23 becomes the H-level signal, which is significant, the output of the delay unit 14 immediately becomes the H-level signal, which is significant. After that, when the output of the OR unit 23 becomes the L-level signal, which is insignificant, the output of the delay unit 14 is held in the significant state for a delay time, as a holding time, outputted by the delay time setting unit 12 and then becomes insignificant.

It is assumed that the holding time (from the time point t1 to the time point t8) in which the delay time setting unit 12 keeps outputting the H-level signal h3 is substantially the same as or longer than the time from the time point t1 when the ECU 20 cancels the power-generation stop command after the ECU 20 generates the power-generation stop command to the time point t7 when a detection time T2 in which the rotation speed detection unit 13 detects the rotation of the vehicle power generator 1 elapses after the controller 5 resumes the PWM-control of the magnetic-field driver 21 and hence respective electric currents flow in the magnetic-field winding 4 and the armature winding 3. This holding time is set due to the respective time constants of the armature winding 3 and the magnetic-field winding 4; because the higher the temperatures of the armature winding 3 and the magnetic-field winding 4 become, the larger the resistance values of the armature winding 3 and the magnetic-field winding 4 become, a delay time T3, as the function of the temperatures of the armature winding 3 and the magnetic-field winding 4, is corrected, so that the time point t8, which is the upper limit value of the holding time of the delay unit 14, is set.

The respective time constants of the armature winding 3 and the magnetic-field winding 4 differ depending on the materials such as the magnetic substances forming the stator and the rotor and the number of turns of each of the windings; thus, it is assumed that the adjustment of the delay time, whether or not the delay time is required, whether or not the temperature correction processing is required, or the like can be changed by means of a ROM, a nonvolatile memory, or the like that is included in the mask processing unit 16.

Next, there will be explained the masking processing, of the non-rotation alarm, that is performed at a time when the control voltage is set to be lower than the power-generation voltage of the vehicle power generator 1. When the ECU 20 generates a power-generation command for setting a control voltage that is lower than the power-generation voltage, i.e., the power-generation stop command, the first comparator 8 does not output the magnetic-field-driver driving logic signal for driving the magnetic-field driver 21, as described above; as a result, the electric-power generation is stopped. When the electric-power generation is stopped, the rotation speed of the vehicle power generator 1 cannot be detected due to the foregoing operation; thus, the non-rotation determination unit 15 determines that the vehicle power generator 1 is not rotating.

The second comparator 19 compares the sawtooth-wave voltage signal c3, which is the control voltage, with the output terminal voltage V1, which is the power-generation voltage of the vehicle power generator 1; in the case where c3>V1, the second comparator 19 generates the H-level signal, which is significant, so as to mask a non-rotation determination signal by way of the OR unit 23, as described above. The second comparator 19 has a hysteresis; thus, the reversal of the magnitude relationship between the output terminal voltage V1, which is the power-generation voltage, and the sawtooth-wave voltage signal c3, which is the control voltage is not immediately reflected in the output thereof. As a result, even in the case where the power-generation voltage is near to the threshold value of the second comparator 19, the mask processing does not become unstable. It is assumed that the range of the foregoing hysteresis can be changed by means of the ROM, the nonvolatile memory, or the like that is included in the mask processing unit 16.

Figure 3:
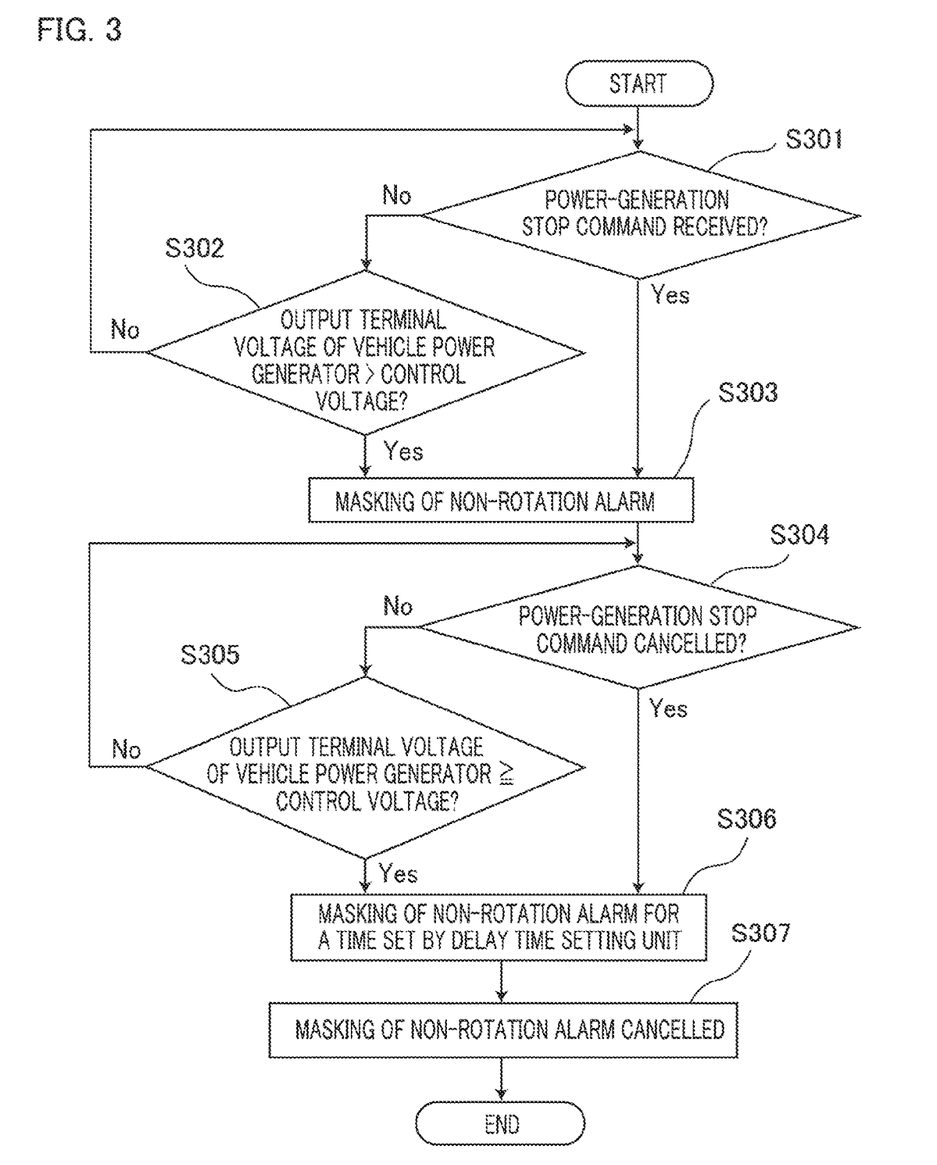
FIG. 3 is a flowchart for explaining the operation of the vehicle-power-generator control apparatus according to Embodiment 1 of the present invention.

FIG. 3 is a flowchart for explaining the operation of the vehicle-power-generator control apparatus according to Embodiment 1 of the present invention; FIG. 3 represents the flows of mask processing of the non-rotation alarm and cancellation processing of the mask processing. In FIG. 3, when the processing starts, it is determined in the step S301 whether or not the reception unit 18 has received the power-generation stop command; in the case where the reception unit 18 has received the power-generation stop command (Yes), the step S301 is followed by the step S303, where the non-rotation alarm is masked; in the case where the reception unit 18 has not received the power-generation stop command (No), the step S301 is followed by the step S302.

In the step S302, it is determined whether or not the output terminal voltage of the vehicle power generator is higher than the sawtooth-wave voltage as the control voltage; in the case where the output terminal voltage of the vehicle power generator is higher than the control voltage (Yes), the step S302 is followed by the step S303; in the case where the output terminal voltage of the vehicle power generator is not higher than the control voltage (No), the step S301 is resumed.

In the step S303, as described above, the non-rotation alarm is masked; then, the step S303 is followed by the step S304. In the step S304, it is determined whether or not the power-generation stop command has been cancelled, i.e., the power-generation stop command has been changed to the power-generation command; in the case where it is determined that the power-generation stop command has been cancelled (Yes), the step S304 is followed by the step S306; in the case where it is determined that the power-generation stop command has not been cancelled (No), the step S304 is followed by the step S305.

In the step S305, the non-rotation alarm is masked only for the time set by the delay time setting unit; then, the step S305 is followed by the step S307. In the step S307, the masking of the non-rotation alarm is cancelled after the delay time set by the delay time setting unit elapses.

Explanation of Comparative Example

Figure 4:
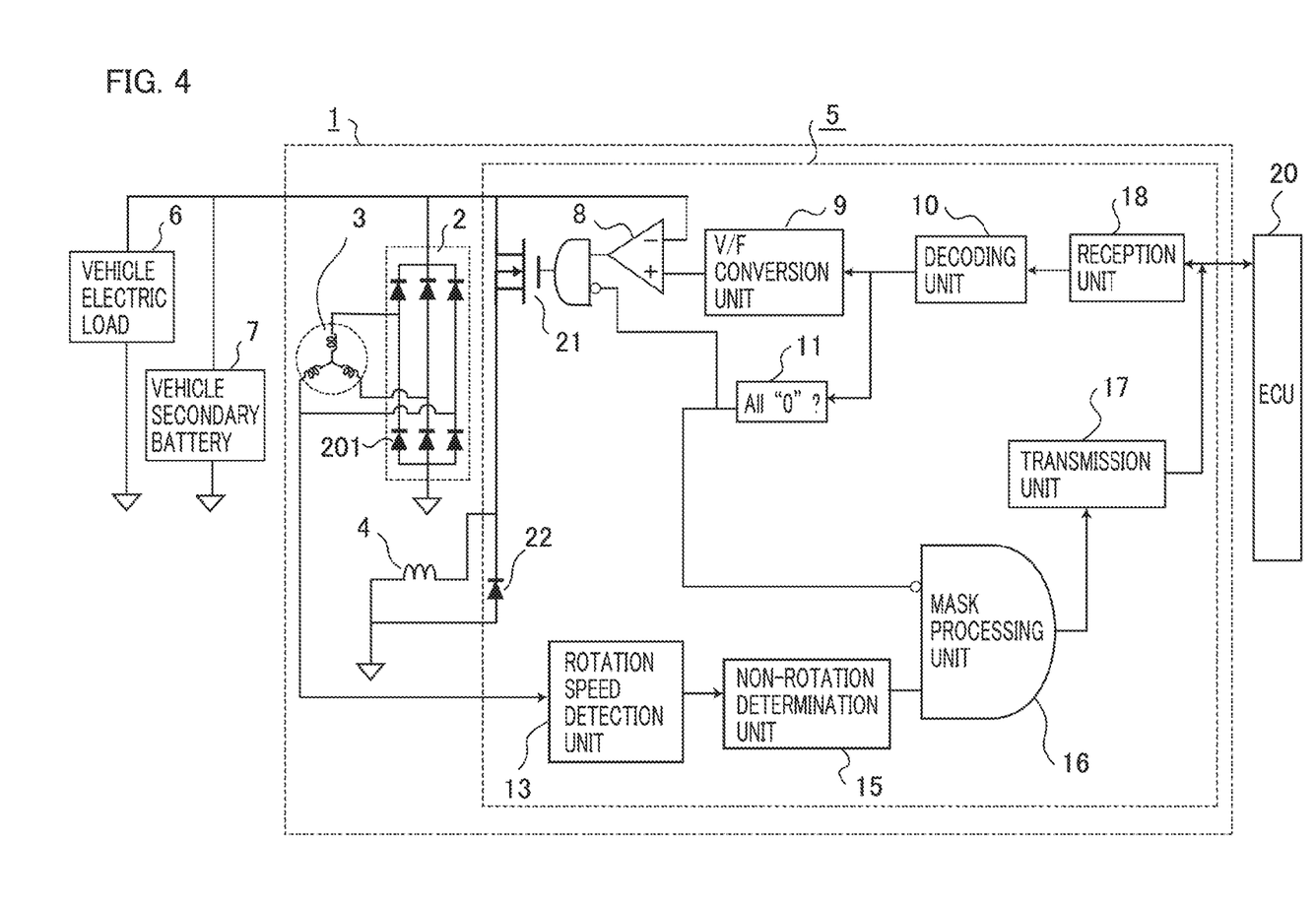
FIG. 4 is a block diagram illustrating a vehicle power generator, as a comparative example of the present invention.

Here, in order to explain the effects of the foregoing vehicle-power-generator control apparatus and the foregoing control method thereof according to Embodiment 1 of the present invention, a vehicle-power-generator control apparatus and the control method thereof according to a comparative example of the present invention will be explained. FIG. 4 is a block diagram illustrating a vehicle power generator, as a comparative example of the present invention; the constituent elements that are the same as or corresponding to those in FIG. 1 are designated by the same reference numerals.

In the power-generator control apparatus, as the comparative example, represented in FIG. 4, the second comparator 19, the OR unit 23, the delay time setting unit 12, and the delay unit 14, which are illustrated in FIG. 1, are not provided. The other configurations are the same as those of the vehicle-power-generator control apparatus according to Embodiment 1 of the present invention, represented in FIG. 1.

Figure 5:
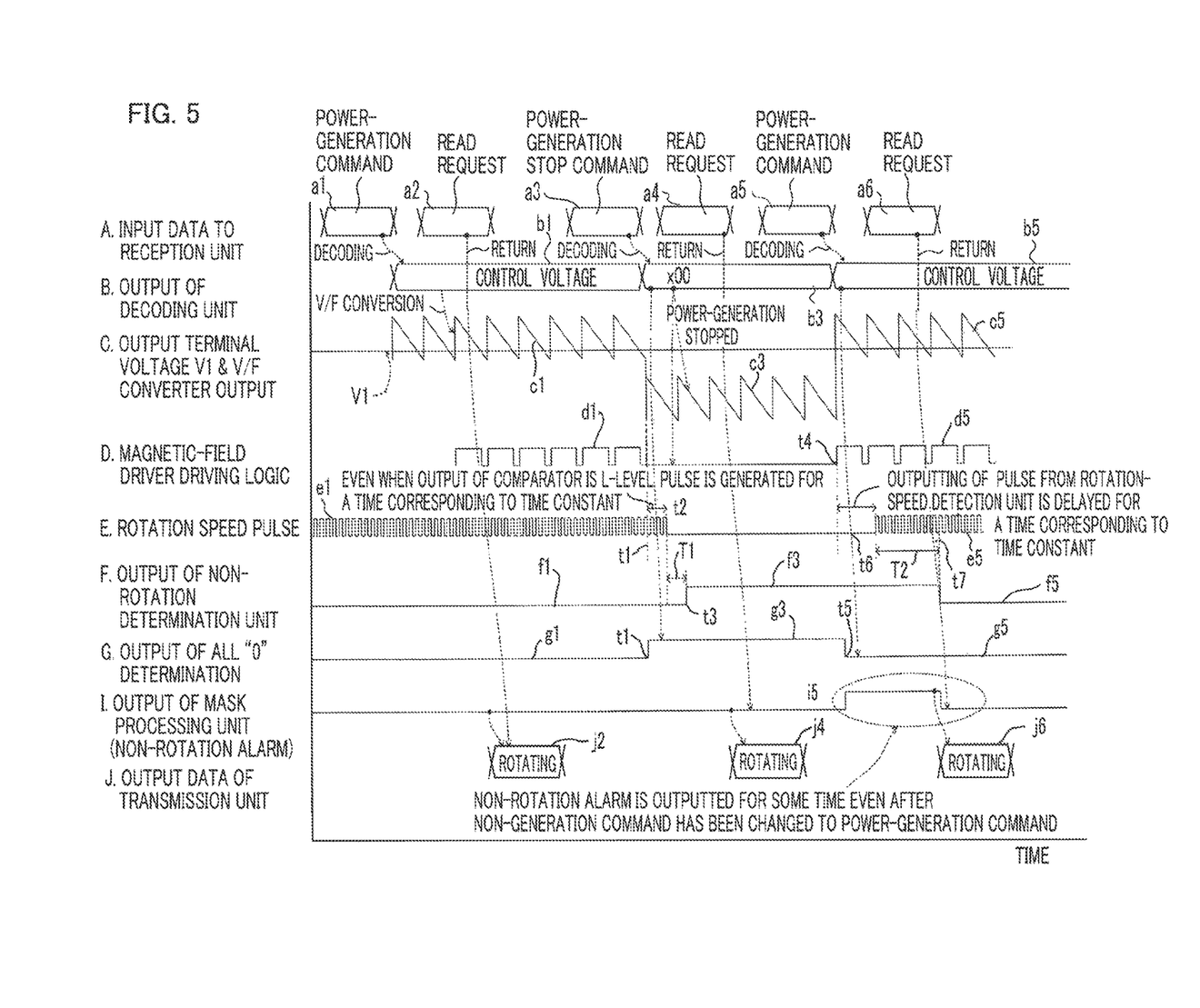
FIG. 5 is a timing chart for explaining the operation of the vehicle power generator, as the comparative example of the present invention.

Next, the operation will be explained. FIG. 5 is a timing chart for explaining the operation of the vehicle power generator, as the comparative example of the present invention. In FIGS. 4 and 5, in the case where at a time point t1, the command signal is changed from the control voltage command signal [control voltage] b1 to the power-generation stop command signal [x00] b3, the power-generation stop command determination unit 11 immediately changes its output signal from an L-Level signal g1 to a H-Level signal g3 at the time point t1, as represented by [G] in FIG. 5.

The H-level signal outputted from the power-generation stop command determination unit 11 is inverted into the L-level signal and is inputted to the mask processing unit 16. In contrast, even when at the time point t1, the control voltage command signal [control voltage] b1 is changed to the power-generation stop command signal [x00] b3 and hence the output of the first comparator 8 becomes the L-level signal, the rotation speed pulse e1, represented by [E] in FIG. 5, that is detected by the rotation speed detection unit 13 disappears at a time point t2, being delayed by a time corresponding to a time constant because there exists the time constant in the armature winding 3. As represented by [F] in FIG. 5, after a detection time T1 elapses from the time point t2 when the rotation speed pulse e1 has disappeared, the non-rotation determination unit 15 determines that the vehicle power generator 1 is not rotating and outputs a H-level signal f3, as a non-rotation signal, at a time point t3.

Furthermore, even when at a time point t4, the power-generation stop command signal [x00] b3 is changed to the control voltage command signal [control voltage] b5 and hence the magnetic-field-driver driving logic driving signal d5 represented by [D] in FIG. 5 starts at the time point t4, a rotation speed pulse e5 is generated, as represented by [E] in FIG. 5, at a time point t6, delayed from the time point t4, due to the effect of the time constant of the armature winding 3 of the vehicle power generator 1. In contrast, as represented by [F] in FIG. 5, the output signal of the power-generation stop command determination unit 11 changes from the H-Level signal g3 to a L-level signal g5 at a time point t5 that is a time point slightly delayed from the time point t4 when the power-generation stop command signal [x00] b3 is changed to the control voltage command signal [control voltage] b5.

As represented by [I] in FIG. 5, at the time point t5 when the output of the power-generation stop command determination unit 11 changes to the L-level signal g5, the mask processing unit 16 outputs a H-level signal I5 and maintains the H-level signal I5 until a time point t7 when the output of the non-rotation determination unit 15 changes from the H-level signal f3 to a L-level signal f5.

As represented by [A] in FIG. 5, as the encoded command signals to be inputted from the ECU 20 to the reception unit 18, the power-generation command a1, the read request a2, the power-generation stop command a3, the read request a4, the power-generation command a5, and the read request a6 are inputted in that order. At the timing when the read request a2 is inputted, the vehicle power generator 1 is generating electric power, based on the control generation command signal [control generation] b1, and hence there exists the rotation speed pulse e1; thus, the output of the non-rotation determination unit 15 is the L-level signal g1. Accordingly, the mask processing unit 16 outputs to the transmission unit 17 a signal indicating that the vehicle power generator 1 is rotating; as represented by [J] in FIG. 5, the transmission unit 17 outputs data [rotating] j2 to the ECU 20.

At the timing when the read request a4 is inputted, the vehicle power generator 1 is not generating electric power, based on the control stop command signal [x00] b3, and hence the rotation speed pulse e1 disappears; thus, the output of the non-rotation determination unit 15 is the H-level signal f3; however, because the delay unit 14 outputs the H-level signal h3, the mask processing unit 16 outputs to the transmission unit 17 a signal indicating that the vehicle power generator 1 is rotating; as represented by [J] in FIG. 2, the transmission unit 17 outputs data [rotating] j4 to the ECU 20.

However, although at the timing when the read request a6 is inputted, the vehicle power generator 1 is generating electric power, based on the control generation command signal [control generation]b5, data [non-rotation alarm] j7 is outputted because the H-level signal from the mask processing unit 16 continues until the time point t7. Accordingly, although the vehicle power generator 1 is rotating, the non-rotation alarm is erroneously outputted.

Figure 6:
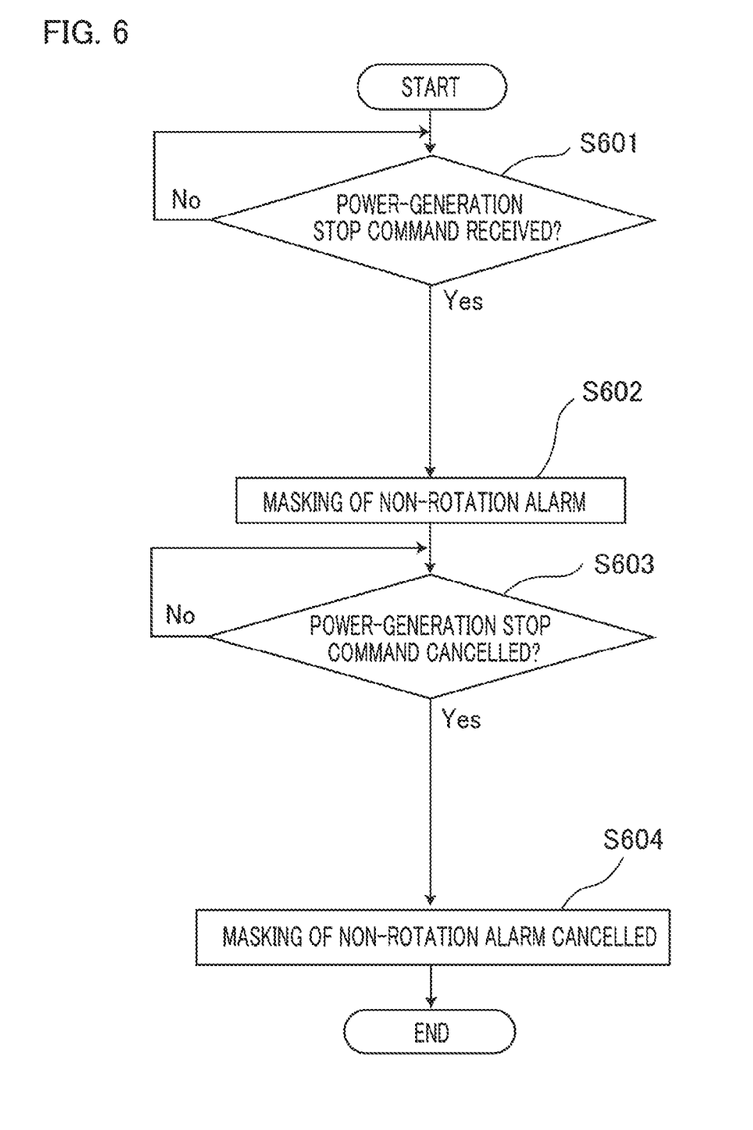
FIG. 6 is a flowchart for explaining the operation of the vehicle power generator, as the comparative example of the present invention.

FIG. 6 is a flowchart for explaining the operation of the vehicle-power-generator control apparatus according to the comparative example. FIG. 6 represents the flows of mask processing of the non-rotation alarm and cancellation processing of the mask processing. In FIG. 6, when the processing starts, it is determined in the step S601 whether or not the reception unit 18 has received the power-generation stop command; in the case where the reception unit 18 has received the power-generation stop command (Yes), the step S601 is followed by the step S602, where the non-rotation alarm is masked; in the case where the reception unit 18 has not received the power-generation stop command (No), the step S601 is resumed.

In the step S603, it is determined whether or not the power-generation stop command has been cancelled, i.e., the power-generation stop command has been changed to the power-generation command; in the case where it is determined that the power-generation stop command has been cancelled (Yes), the step S603 is followed by the step S604; in the case where it is determined that the power-generation stop command has not been cancelled (No), the step S603 is resumed. In the step S604, the masking of the non-rotation alarm is cancelled.

The load of software processing in the foregoing comparative example of the present invention is not large in comparison with the vehicle-power-generator control apparatus according to Embodiment 1 of the present invention; however, when the ECU 20 cancels the power-generation stop command, the control apparatus 5 for the vehicle-power-generator 1 tries to immediately resume the power generation; however, due to the time constants of the magnetic-field winding 4 and the armature winding 3 to be utilized in the power generation, the magnetic-field current starts to flow after a voltage is applied to the magnetic-field winding 4 and a certain amount of time elapses; then, after the rotation speed detection pulse is generated across the armature winding 3, the rotation speed can finally be detected. Accordingly, because the method, according to the comparative example, of mask-processing the non-rotation alarm does not make it possible to mask the non-rotation alarm that is generated after the power-generation stop command is cancelled, the ECU is notified of the non-rotation alarm.

In contrast, as described above, in the vehicle-power-generator control apparatus and the control method thereof according to Embodiment 1 of the present invention, the non-rotation alarm is not erroneously outputted, unlike the comparative example.

The present invention is not limited to the vehicle-power-generator control apparatus and the control method thereof according to Embodiment 1, described above; in the scope within the spirits of the present invention, the configuration of Embodiment 1 can partially be modified or omitted.

What is claimed is:

1. A vehicle-power-generator control apparatus that controls a vehicle power generator mounted in a vehicle, based on a command from a controller provided in the vehicle, the vehicle-power-generator control apparatus comprising:
    a receiver that receives a command signal obtained by encoding the command from the controller;
    a decoder that decodes the command signal received by the receiver and then outputs a control voltage based on the command from the controller;
    a first comparator that compares the control voltage with an output voltage based on a power-generation voltage that is generated across an armature winding by the vehicle power generator;
    a magnetic-field driver that controls the power-generation voltage by controlling a magnetic-field current flowing in a magnetic-field winding of the vehicle power generator, based on an output signal of the first comparator;
    a rotation speed detector that detects a rotation speed of the vehicle power generator, based on the power-generation voltage generated across the armature winding of the vehicle power generator;
    a non-rotation determiner that determines that the vehicle power generator is not rotating and generates a non-rotation determination signal, when the rotation speed detected by the rotation speed detector is the same as or lower than a predetermined value;
    a power-generation stop command determiner whose output signal changes a level thereof depending on whether or not the command signal decoded by the decoder is a power-generation stop command signal for stopping electric-power generation;
    a second comparator that generates an output signal, based on comparison between the control voltage and the output voltage based on the power-generation voltage generated by the vehicle power generator;
    a logic device that generates a power-generation stop signal indicating that the electric-power generation has stopped, based on the output signal of the power-generation stop command determiner and the output signal of the second comparator;
    a delay device to which the power-generation stop signal generated by the logic device is inputted and that generates a power-generation stop holding signal obtained by delaying by a predetermined time ache terminating time point of the inputted power-generation stop signal; and
    a mask processor that invalidates the non-rotation determination signal generated by the non-rotation determiner, based on the power-generation stop holding signal generated by the delay device.

2. The vehicle-power-generator control apparatus according to claim 1, wherein the delay device immediately generates the power-generation stop holding signal, when the power-generation stop signal is inputted thereto.

3. The vehicle-power-generator control apparatus according to claim 1, wherein the predetermined time is a time at least until generation of the non-rotation determination signal is stopped.

4. The vehicle-power-generator control apparatus according to claim 1, wherein a delay time setter that can change the predetermined time is provided.

5. The vehicle-power-generator control apparatus according to claim 4, wherein the delay time setter can change the predetermined time, based on respective temperatures of the armature winding and the magnetic-field winding of the vehicle power generator.

6. The vehicle-power-generator control apparatus according to claim 1, wherein the second comparator has hysteresis characteristics and, when the output voltage based on the power-generation voltage generated by the vehicle power generator changes, the change is not immediately reflected as a change in the output signal of the second comparator.

7. A vehicle-power-generator control method that controls a vehicle power generator mounted in a vehicle, based on a command from a controller provided in the vehicle, the vehicle-power-generator control method comprising the steps of:

(1) receiving a command signal obtained by encoding the command from the controller;

(2) decoding the received command signal into a control voltage based on the command from the controller;

(3) controlling a magnetic-field current of the vehicle power generator, based on comparison between the control voltage and an output voltage based on a power-generation voltage generated by the vehicle power generator, so as to control the power-generation voltage;

(4) determining that the vehicle power generator is not rotating, and generating a non-rotation determination signal, when a rotation speed, of the vehicle power generator, that is detected based on the power-generation voltage generated across an armature winding of the vehicle power generator is the same as or lower than a predetermined value;

(5) generating a power-generation stop holding signal obtained by delaying by a predetermined time a time point at which a power-generation stop signal, generated when the decoded command signal is a power-generation stop command for stopping electric-power generation, stops; and (6) masking and invalidating the non-rotation determination signal, based on the power-generation stop holding signal.

8. The vehicle-power-generator control method according to claim 7, wherein the predetermined time is a time at least until generation of the non-rotation determination signal is stopped.

* * * * *